US012582974B2

(12) United States Patent
Yoon et al.

(10) Patent No.: US 12,582,974 B2
(45) Date of Patent: Mar. 24, 2026

(54) NO$_X$ STORAGE CATALYST AND METHOD FOR PREPARING THE SAME

(71) Applicants: Hyundai Motor Company, Seoul (KR); Kia Corporation, Seoul (KR); INDUSTRY FOUNDATION OF CHONNAM NATIONAL UNIVERSITY, Gwangju (KR)

(72) Inventors: Dalyoung Yoon, Seongnam-si (KR); Soon Hee Park, Gwangju (KR); Sung June Cho, Gwangju (KR)

(73) Assignees: Hyundai Motor Company, Seoul (KR); Kia Corporation, Seoul (KR); Industry Foundation of Chonnam National University, Gwangju (KR)

( * ) Notice: Subject to any disclaimer, the term of this patent is extended or adjusted under 35 U.S.C. 154(b) by 0 days.

(21) Appl. No.: 18/772,490

(22) Filed: Jul. 15, 2024

(65) Prior Publication Data

US 2024/0367158 A1     Nov. 7, 2024

Related U.S. Application Data

(62) Division of application No. 17/212,482, filed on Mar. 25, 2021, now Pat. No. 12,083,510.

(30) Foreign Application Priority Data

Nov. 4, 2020     (KR) ........................ 10-2020-0146181

(51) Int. Cl.
| | |
|---|---|
| *B01J 23/83* | (2006.01) |
| *B01J 29/70* | (2006.01) |
| *B01J 29/76* | (2006.01) |
| *B01J 35/00* | (2006.01) |
| *C01B 39/48* | (2006.01) |
| *F01N 3/08* | (2006.01) |

(52) U.S. Cl.
CPC ............. *B01J 29/763* (2013.01); *B01J 23/83* (2013.01); *B01J 29/7065* (2013.01); *B01J 35/19* (2024.01); *C01B 39/48* (2013.01); *F01N 3/0842* (2013.01)

(58) Field of Classification Search
None
See application file for complete search history.

(56) References Cited

U.S. PATENT DOCUMENTS

| | | | |
|---|---|---|---|
| 6,187,283 B1 | 2/2001 | Chiyoda et al. | |
| 2010/0290963 A1 | 11/2010 | Andersen et al. | |

| | | | |
|---|---|---|---|
| 2012/0244066 A1 | 9/2012 | Bull et al. | |
| 2013/0111876 A1 | 5/2013 | Qi et al. | |
| 2013/0142727 A1 | 6/2013 | Li et al. | |
| 2013/0336865 A1 | 12/2013 | Brisley et al. | |
| 2015/0151288 A1 | 6/2015 | Rivas-Cardona et al. | |
| 2018/0163598 A1 | 6/2018 | Mizuno et al. | |
| 2019/0322537 A1 | 10/2019 | Kim et al. | |
| 2019/0330071 A1 | 10/2019 | Cho et al. | |
| 2020/0223707 A1 | 7/2020 | Cho et al. | |
| 2020/0230583 A1* | 7/2020 | Banno ................. B01J 29/7057 |
| 2022/0001371 A1 | 1/2022 | Li | |

FOREIGN PATENT DOCUMENTS

| | | | | |
|---|---|---|---|---|
| CN | 105236440 A | 1/2016 | | |
| CN | 106986354 A | 7/2017 | | |
| CN | 110291041 A | 9/2019 | | |
| CN | 110479358 A | 11/2019 | | |
| CN | 110961144 A | 4/2020 | | |
| CN | 111032571 A | 4/2020 | | |
| CN | 111056561 A | 4/2020 | | |
| CN | 111108067 A | 5/2020 | | |
| CN | 111484037 A | 8/2020 | | |
| EP | 0758561 A1* | 2/1997 | .............. B01J 20/18 |
| JP | 2007160167 A | 6/2007 | | |
| KR | 20120106960 A | 9/2012 | | |
| KR | 20180063527 A | 6/2018 | | |
| KR | 20190099817 A | 8/2019 | | |
| WO | 2012085564 A1 | 6/2012 | | |
| WO | 2013065768 A1 | 5/2013 | | |
| WO | 2015001123 A1 | 1/2015 | | |
| WO | 2016096653 A1 | 6/2016 | | |
| WO | 2020092113 A1 | 5/2020 | | |

OTHER PUBLICATIONS

Jie Fan et al., Significant promoting effect of Ce or La on the hydrothermal stability of Cu-SAPO-34 catalyst for NH3-SCR reaction, Chemical Engineering Journal, vol. 369, pp. 908-919, Aug. 1, 2019, Total pp. 12.
Wang Tianyi, "A study on the effect of additives on the preparation of SAPO-34 molecular sieves and the catalytic performance of MTO", Wanfangdata, Oct. 27, 2020, Total pp. 23.

* cited by examiner

*Primary Examiner* — Sheng H Davis
(74) *Attorney, Agent, or Firm* — Slater Matsil, LLP

(57) ABSTRACT

A NO$_X$ storage catalyst includes CHA zeolite, a transition metal ion-exchanged in the CHA zeolite, and a rare earth metal that is different the transition metal and is supported on the CHA zeolite. A method for preparing a NO$_X$ storage catalyst includes preparing a synthetic mother liquid including a zeolite raw material as a source of silica and alumina, a structure-inducing material, a complexing material, and a solvent, reacting the synthetic mother liquid to prepare a CHA zeolite, and supporting a transition metal and a rare earth metal that is different from the transition metal on the prepared CHA zeolite.

17 Claims, 7 Drawing Sheets

NO Concentration(ppm)

Cu / La(20) / CHA

Cu / La(15) / CHA

Cu / La(10) / CHA

Cu / La(5) / CHA

Cu / CHA 100        200        300        400        500        600

Temperature (℃)

NO_X STORAGE CATALYST AND METHOD FOR PREPARING THE SAME

CROSS-REFERENCE TO RELATED APPLICATIONS

This application is a divisional application of U.S. application Ser. No. 17/212,482, filed Mar. 25, 2021, which claims the benefit of Korean Patent Application No. 10-2020-0146181, filed in the Korean Intellectual Property Office on Nov. 4, 2020, where applications are hereby incorporated herein by reference.

TECHNICAL FIELD

The present disclosure relates to a $NO_X$ storage catalyst and a method for preparing the same.

BACKGROUND

As regulations on exhaust gas become increasingly stringent, the performance of catalysts at the initial start-up becomes increasingly important. However, since a three-way catalyst takes some time to be activated, most of the exhaust gas is discharged before the activation after the start-up.

In order to compensate for this, adsorption or occlusion type catalysts have been developed. These catalysts absorb or occlude exhaust gas components at the initial start-up of vehicles and thus suppress emission of the exhaust gas, while the three-way catalyst is warmed up.

For example, a $NO_X$ storage catalyst occludes $NO_X$ at the initial start-up, and then, under a reduction atmosphere at a high temperature, the stored $NO_X$ is removed by a reducing agent component in the exhaust gas.

However, as high efficiency engine technology is applied to cope with fuel efficiency and the reinforced regulations and thus gradually decreases an exhaust gas temperature, there is a limit to reducing $NO_X$ emitted from a cold start section, which is a low temperature section at the initial start-up.

SUMMARY

The present disclosure relates to a $NO_X$ storage catalyst and a method for preparing the same. Particularly embodiments relate to a $NO_X$ storage catalyst having improved storage performance of $NO_X$ discharged from a cold start section, which is a low temperature section at the initial start-up.

Embodiments of the present disclosure can provide a $NO_X$ storage catalyst having excellent storage performance of $NO_X$ discharged from a cold start section, which is a low temperature section at the initial start-up period.

Other embodiments of the present disclosure provide a method for preparing the $NO_X$ storage catalyst.

According to an embodiment of the present disclosure, a catalyst for storing $NO_X$ includes a CHA zeolite, a transition metal ion-exchanged with the CHA zeolite, and a rare earth metal that is different the transition metal and is supported on the CHA zeolite.

The CHA zeolite may be an aluminosilicate zeolite.

The CHA zeolite may have a Si/Al mole ratio of about 1 to about 50.

The transition metal may include Cu, Fe, Co, Ti, Zn, Ag, Mn, or a combination thereof.

The rare earth metal may include La, Ce, Nd, Pr, Pm, Sm, Eu, Gd, Tb, Dy, Ho, Er, Tm, Yb, Lu, or a combination thereof.

The catalyst may include about 1 wt % to about 10 wt % of the transition metal based on a total weight of the catalyst.

The catalyst may include about 1 wt % to about 30 wt % of the rare earth metal based on a total weight of the catalyst.

The catalyst may include about 1.5 wt % to about 3 wt % of Cu and about 3 wt % to about 16 wt % of La based on a total weight of the catalyst.

The catalyst may include about 1.5 wt % to about 3 wt % of Cu and about 6 wt % to about 16 wt % of Ce based on a total weight of the catalyst.

The catalyst may further include Be, Mg, Ca, Sr, Ba, Ra, Li, Na, K, Rb, Cs, Pr, or a combination thereof which is ion-exchanged in the CHA zeolite.

According to an embodiment of the present disclosure, a method for preparing a $NO_X$ storage catalyst includes preparing a synthetic mother liquid including a zeolite raw material as a source of silica and alumina, a structure-inducing material, a complexing material, and a solvent, reacting the synthetic mother liquid to prepare a CHA zeolite, and supporting a transition metal and a rare earth metal that is different from the transition metal on the prepared CHA zeolite.

The zeolite raw material may include a zeolite Y type, or an ultra stable zeolite Y (zeolite USY) type.

The zeolite raw material may have a $SiO_2/Al_2O_3$ mole ratio of about 5 to about 100.

The structure-inducing material may include benzyl trimethyl ammonium hydroxide, benzyl trimethyl ammonium chloride, trimethyladamantyl ammonium hydroxide (AdaOH), choline chloride, or a combination thereof.

The synthetic mother liquid may include about 0.1 parts by mole to about 0.4 parts by mole of the structure-inducing material and about 0.1 parts by mole to about 0.4 parts by mole of the complexing material based on 1 part by mole of the zeolite raw material.

The $NO_X$ storage catalyst of the present disclosure has improved storage performance of $NO_X$ discharged from a cold start section, which is a low temperature section at the initial start-up.

DETAILED DESCRIPTION OF ILLUSTRATIVE EMBODIMENTS

Figure 1:
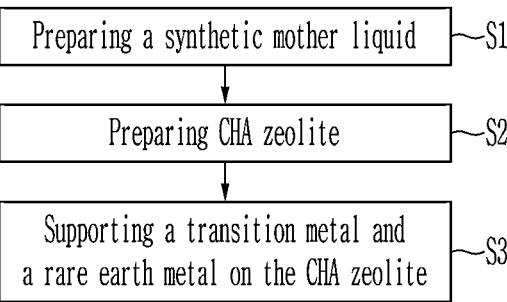
FIG. 1 is a process flow chart showing a method for preparing a $NO_X$ storage catalyst according to an embodiment of the present disclosure.

This disclosure will be described more fully hereinafter in the following detailed description, in which some but not all embodiments of this disclosure are described with reference to the attached drawings. This disclosure may be embodied in many different forms and is not be construed as limited to the embodiments set forth herein. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted.

In addition, unless explicitly described to the contrary, the word "comprise," and variations such as "comprises" or "comprising," will be understood to imply the inclusion of the stated elements but not the exclusion of any other elements.

Further, the singular includes the plural unless mentioned otherwise.

A $NO_X$ storage catalyst according to an embodiment of the present disclosure includes a CHA zeolite, a transition metal ion-exchanged in the CHA zeolite, and a rare earth metal that is different the transition metal and is supported on the CHA zeolite.

The CHA (chabazite) zeolite is a small-pore zeolite having eight-membered-ring pores (about 3.8 angstroms) connected through a three-dimensional porous structure. The cage structure of the CHA zeolite is obtained connecting a double 6-ring building unit with 4 rings.

The CHA zeolite may be an aluminosilicate zeolite, borosilicate, gallosilicate, SAPO, ALPO, MeAPSO, or MeAPO, and for example, the crystal structure of the CHA zeolite may be an aluminosilicate zeolite.

The CHA zeolite may have a Si/Al mole ratio of about 1 to about 50, for example about 4 to about 40, or about 5 to about 30.

In the CHA zeolite, the transition metal and a rare earth metal that is different the transition metal are supported thereon.

The transition metal may include Cu, Fe, Co, Ti, Zn, Ag, Mn, or a combination thereof, for example Cu.

The catalyst may include about 1 wt % to about 10 wt %, for example, about 1 wt % to about 5 wt %, or about 1.5 wt % to about 3 wt % of the transition metal based on a total weight of the catalyst.

The rare earth metal may include La, Ce, Nd, Pr, Pm, Sm, Eu, Gd, Tb, Dy, Ho, Er, Tm, Yb, Lu, or a combination thereof, for example La or Ce.

The catalyst may include about 1 wt % to about 30 wt %, for example, about 3 wt % to about 30 wt %, or about 3 wt % to about 16 wt % of the rare earth metal based on a total weight of the catalyst.

Specifically, when the rare earth metal is La, the catalyst may include about 3 wt % to about 16 wt % of the rare earth metal based on a total weight of the catalyst and when the rare earth metal is Ce, the catalyst may include about 6 wt % to about 16 wt % of the rare earth metal based on a total weight of the catalyst.

Meanwhile, the catalyst may be degraded through hydrothermal treatment. The hydrothermal treatment may be performed for about 12 hours, while flowing air including about 10% of water at about 100 ml/min into a catalyst layer heated at about 650° C. to about 850° C.

On the other hand, the catalyst may be further ion-exchanged with an alkaline-earth metal or an alkali metal in addition to the transition metal and the rare earth metal, and specifically may be further ion-exchanged with Be, Mg, Ca, Sr, Ba, Ra, Li, Na, K, Rb, Cs, Pr, or a combination thereof.

A method for preparing the $NO_X$ storage catalyst includes preparing a synthetic mother liquid including a zeolite raw material as a source of silica and alumina, a structure-inducing material, a complexing material, and a solvent, reacting the synthetic mother liquid to prepare a CHA zeolite, and supporting a transition metal and a rare earth metal that is different from the transition metal on the prepared CHA zeolite.

FIG. 1 is a process flow chart showing a method for preparing the $NO_X$ storage catalyst. Hereinafter, a method for preparing the $NO_X$ storage catalyst is described with reference to FIG. 1.

First, synthetic mother liquid including a zeolite raw material, structure-inducing material, a complexing material, and a solvent is prepared (S1).

The zeolite raw material may include a zeolite Y type, or an ultra-stable zeolite Y (zeolite USY) type.

The zeolite raw material may have a $SiO_2/Al_2O_3$ mole ratio of about 5 to about 100, and for example, the zeolite raw material may be a zeolite USY having a $SiO_2/Al_2O_3$ mole ratio of about 30.

The structure-inducing material may include benzyl trimethyl ammonium hydroxide, benzyl trimethyl ammonium chloride, trimethyladamantyl ammonium hydroxide (AdaOH), choline chloride, or a combination thereof. In addition, a generally-used structure-inducing material for preparing CHA may also be included.

The complexing material may be an alkali hydroxide solution including sodium hydroxide.

The synthetic mother liquid may include about 0.1 parts by mole to about 0.4 parts by mole of the structure-inducing material and about 0.1 parts by mole to about 0.4 parts by mole of the complexing material based on 1 part by mole of the zeolite raw material. According to the amount of the complexing material added to the synthetic mother liquid, an amount of aluminum present in the synthesized CHA zeolite skeleton may vary, and thereby hydrothermal characteristics may vary. Accordingly, the CHA zeolite prepared in the present disclosure may have a Si/Al mole ratio of about 1 to about 50.

Subsequently, the synthetic mother liquid is reacted to prepare CHA zeolite (S2).

Specifically, the synthetic mother liquid is reacted at about 120° C. to about 140° C. for about 2 days to about 6 days, while rotated at about 0 rpm to about 60 rpm and then, separated through centrifugation, washed, and fired at about 500° C. to about 600° C. for about 6 hours to about 12 hours to prepare a CHA zeolite.

On the other hand, the CHA zeolite may be Na-formed CHA zeolite, and optionally, preparing $NH_4$-formed CHA zeolite may be further included by ion-exchanging the Na-formed CHA zeolite with cations. Specifically, the Na-formed CHA zeolite is dipped in a 1.5 M ammonium nitrate aqueous solution and then, stirred at about 60° C. to about 80° C. for greater than or equal to about 3 hours, which may be three times repeated to ion-exchange it into the form of $NH_4^+$, and then, washed and dried to obtain the $NH_4$-formed CHA zeolite.

Subsequently, a transition metal and a rare earth metal that is different the transition metal is supported on the prepared CHA zeolite (S3).

Specifically, the supporting the transition metal and the rare earth metal on the CHA zeolite may include impregnating the CHA zeolite with the rare earth metal precursor solution and firing the resultant to prepare a CHA zeolite on which a rare earth metal is supported, and then ion-exchanging the CHA zeolite on which a rare earth metal is supported in a solution including a transition metal precursor to support the transition metal.

The precursors of the transition metal and the rare earth metal may include a nitrate, a hydrochloride, an acetate salt, or a sulfate. For example, when the transition metal is Cu, the precursor may be copper nitrate (II) ($Cu(NO_3)_2$) or copper acetate (Cu acetate), when the rare earth metal is La, the precursor may be lanthanum nitrate, and when the rare earth metal is Ce, the precursor may be cerium nitrate.

The solvent may include distilled water, deionized water, ethanol, methanol, ethylene glycol, propylene glycol, isopropyl alcohol, or a combination thereof.

The ion-exchanging may be performed at about 25° C. to about 80° C. for about 1 hour to about 24 hours depending on a type of the transition metal and an amount of exchanged ions.

On the other hand, the prepared $NO_X$ storage catalyst may be hydrothermally treated for a hydrothermal stability test. The hydrothermal treatment may be performed for about 12 hours, while flowing air including about 10% of water at about 100 ml/min into a catalyst layer heated at about 650° C. to about 850° C.

Hereinafter, specific examples of the invention are presented. However, the examples described below are for illustrative purposes only, and the scope of the invention is not limited thereto.

Preparation Example 1: Preparation of CHA Zeolite

Preparation Example 1

A synthetic mother liquid was prepared with the composition shown in Table 1.

The synthetic mother liquid was mixed and put in an autoclave and then, reacted for 4 days, while rotated at 40 rpm at 140° C., separated through centrifugation, washed, and fired at 550° C. for 12 hours to obtain a CHA zeolite (CHA-1, Si/Al=12.1).

TABLE 1

| | Composition of synthetic mother liquid (parts by mole) | | | |
|---|---|---|---|---|
| | Si and Al a source | SDA[1] | NaOH | H$_2$O |
| Preparation Example (CHA-1) | 1.0 (USY, Si/Al = 15) | 0.3 | 0.3 | 22.6 |

[1]SDA: benzyltrimethyl ammonium chloride (BTMACl)

Preparation Example 2: Preparation of NO$_X$ Storage Catalyst

Comparative Example 1

The CHA zeolite (CHA-1) according to Preparation Example 1 was added to a 1.0 M copper nitrate aqueous solution for an ion exchange at 25° C. for 24 hours and then, washed, dried, and fired to prepare CHA zeolite ion-exchanged with copper.

Example 1

The CHA zeolite (CHA-1) of Preparation Example 1 was impregnated in a lanthanum nitrate aqueous solution and then, dried at 100° C. for 12 hours, and fired at 550° C. for 2 hours to prepare La(x)/CHA (x is wt % of supported La) in which La was respectively supported at 5 wt %, 10 wt %, 15 wt %, 20 wt %, and 30 wt %.

The La(x)/CHA was added to a 1.0 M copper nitrate aqueous solution for an ion exchange at 25° C. for 24 hours and then, washed, dried, and fired at 550° C. for 2 hours to prepare Cu/La(x)/CHA zeolite ion-exchanged with copper (Cu: 2 wt % to 2.5 wt %).

Example 2

The CHA zeolite (CHA-1) of Preparation Example 1 was impregnated in a cerium nitrate aqueous solution, dried at 100° C. for 12 hours, and fired at 550° C. for 2 hours to prepare Ce(x)/CHA (x is wt % of supported Ce) in which Ce was respectively supported at 5 wt %, 10 wt %, 15 wt %, 20 wt %, and 30 wt %.

The prepared Ce(x)/CHA was added to a 1.0 M copper nitrate aqueous solution for an ion exchange at 25° C. for 24 hours and then, washed, dried, and fired at 550° C. for 2 hours to prepare Cu/Ce(x)/CHA zeolite (Cu: 1.9 wt % to 3.0 wt %) ion-exchanged with copper.

Experimental Example: Performance Evaluation of NO$_X$ Storage Catalyst

The catalysts according to Examples 1 and 2 were hydrothermally treated (degraded) for 12 hours by flowing air containing about 10% of water at 100 ml/min into catalyst layers heated up to 750° C., and then, NO adsorption performances thereof before and after the degradation were evaluated.

In the NO adsorption performance evaluation, 0.2 g of each catalyst was pretreated for 1 hour at 500° C. with air flowing, 500 ppm of NO was adsorbed, while flown through each catalyst layer heated at 50° C. for one hour, and then, purging was performed by flowing N$_2$ at 50° C. for 1 hour. Subsequently, a concentration of desorbed NO$_X$ under the N$_2$ flow was measured, while the temperature was increased up to 600° C. at 10° C./min.

Figure 2:
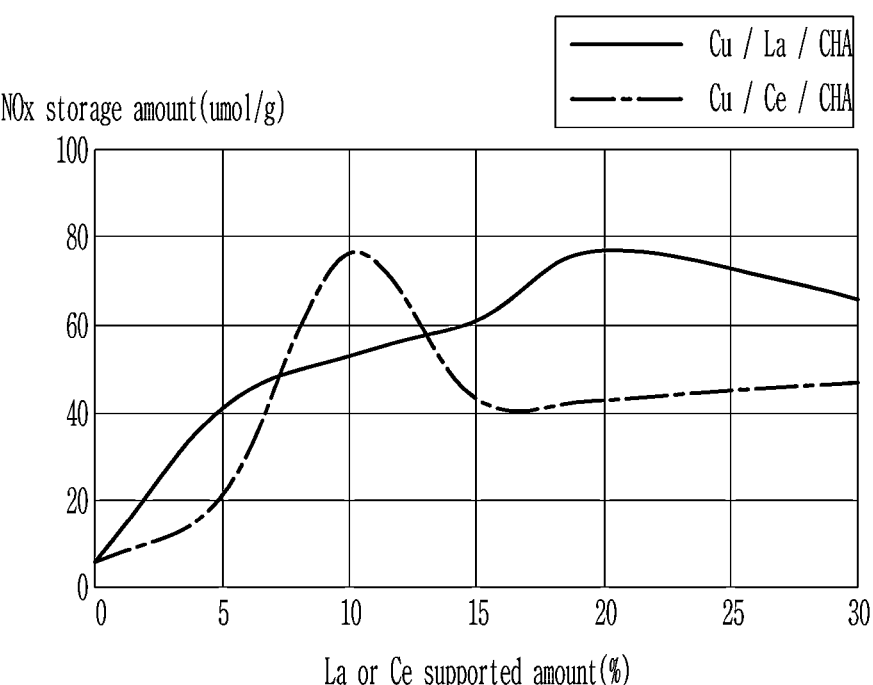
FIGS. 2 and 3 are graphs showing NO adsorption results before/after degradation of the $NO_X$ storage catalysts prepared in Examples 1 and Example 2.
Figure 3:
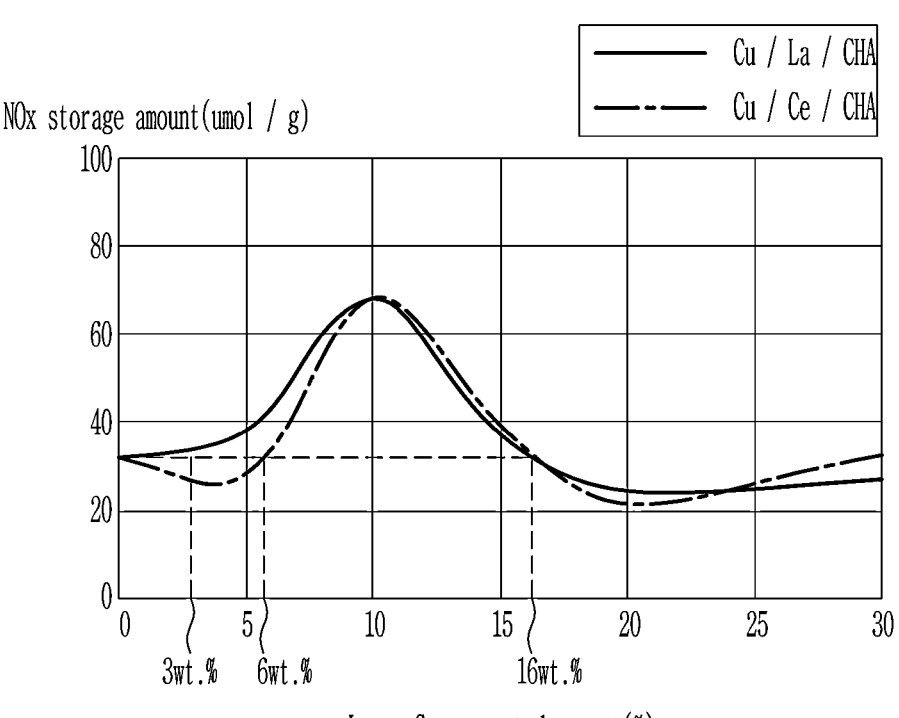

FIGS. 2 and 3 are graphs showing NO adsorption results before/after degradation of the NO$_X$ storage catalysts prepared in Examples 1 and 2. FIG. 2 is the graph showing the NO$_X$ storage catalysts before the degradation, and FIG. 3 is the graph showing the NO$_X$ storage catalysts after the degradation.

Referring to FIGS. 2 and 3, before the degradation, when La and Ce were supported, NO$_X$ storage amount increased regardless of their contents, but after the degradation, when 3 wt % to 16 wt % of La and 6 wt % to 16 wt % of Ce were supported, the NO$_X$ storage amount increased.

Figure 4:
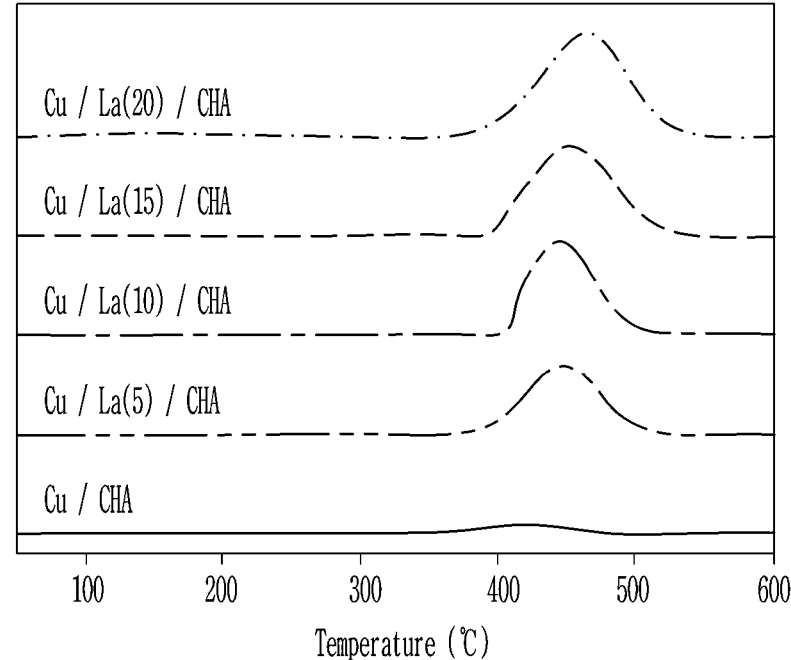
FIGS. 4 and 5 are graphs showing NO TPD (Temperature Programmed Desorption) measurement results before/after degradation of the $NO_X$ storage catalyst prepared in Example 1.
Figure 5:
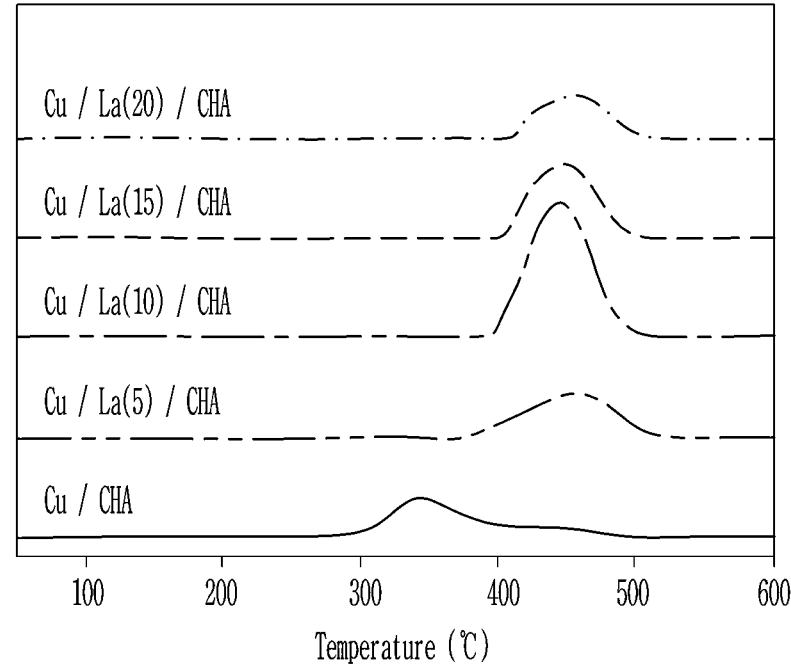

FIGS. 4 and 5 are graphs showing NO TPD (Temperature Programmed Desorption) measurement results before/after degradation of the NO$_X$ storage catalyst prepared in Example 1. FIG. 4 is the graph showing NO TPD measurement results before the degradation, and FIG. 5 is the graph showing NO TPD measurement results after the degradation.

Referring to FIGS. 4 and 5, when La was supported, NO$_X$ storage performance before/after the degradation was improved, and before the degradation, Cu/La(20)/CHA exhibited maximum NO storage amount, and after the degradation, Cu/La(10)/CHA exhibited maximum NO storage.

Figure 6:
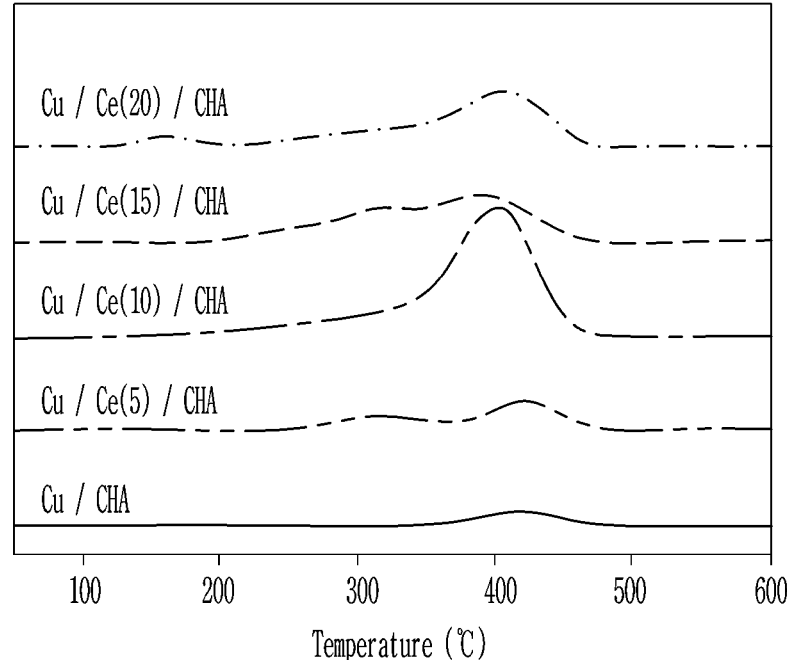
FIGS. 6 and 7 are graphs showing NO TPD (Temperature Programmed Desorption) measurement results before/after degradation of the $NO_X$ storage catalyst prepared in Example 2.
Figure 7:
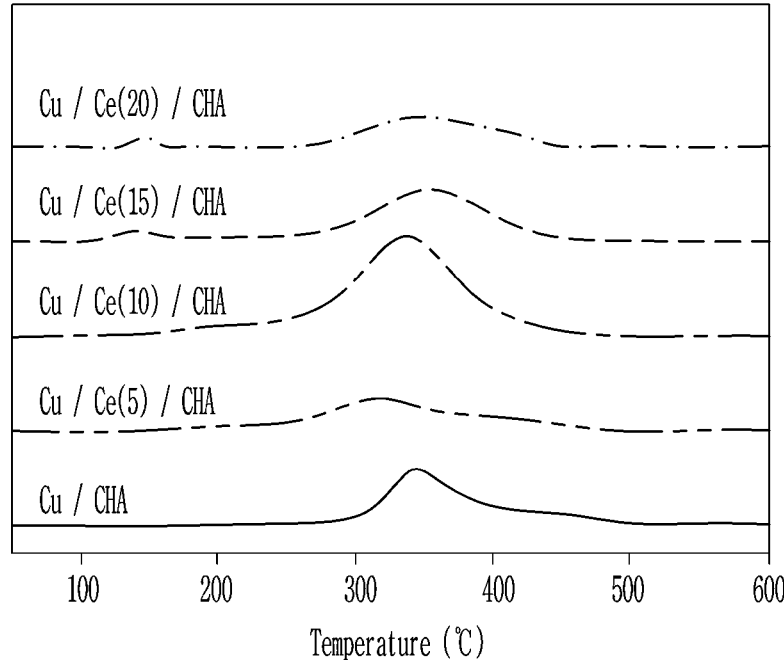

FIGS. 6 and 7 are graphs showing NO TPD (Temperature Programmed Desorption) measurement results before/after degradation of the NO$_X$ storage catalyst prepared in Example 2. FIG. 6 is the graph showing the NO TPD measure results before the degradation, and FIG. 7 is the graph showing the NO TPD measurement results after the degradation.

Referring to FIGS. 6 and 7, when Ce was supported, the $NO_X$ storage performance before/after the degradation was improved, and Cu/Ce(10)/CHA exhibited maximum NO storage amount.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A $NO_X$ storage catalyst comprising:
CHA zeolite;
a transition metal ion-exchanged in the CHA zeolite; and
a rare earth metal that is different from the transition metal and is supported on the CHA zeolite;
wherein the transition metal consists essentially of Cu;
wherein the rare earth metal consists essentially of La;
wherein the $NO_X$ storage catalyst comprises about 16 wt % to about 30 wt % of the La based on a total weight of the $NO_X$ storage catalyst; and
wherein the $NO_X$ storage catalyst comprises about 1.5 wt % to about 3 wt % of the Cu based on the total weight of the $NO_X$ storage catalyst.

2. The $NO_X$ storage catalyst of claim 1, wherein the CHA zeolite is aluminosilicate zeolite.

3. The $NO_X$ storage catalyst of claim 1, wherein the CHA zeolite has a Si/Al mole ratio of about 1 to about 50.

4. The $NO_X$ storage catalyst of claim 1, wherein the transition metal consists of Cu and wherein the rare earth metal consists of La.

5. A $NO_X$ storage catalyst comprising:
CHA zeolite;
a transition metal ion-exchanged in the CHA zeolite; and
a rare earth metal that is different from the transition metal and is supported on the CHA zeolite;
wherein the transition metal consists essentially of Cu;
wherein the rare earth metal consists essentially of Ce;
wherein the $NO_X$ storage catalyst comprises about 16 wt % to about 30 wt % of the Ce based on a total weight of the $NO_X$ storage catalyst; and
wherein the $NO_X$ storage catalyst comprises about 1.9 wt % to about 3 wt % of the Cu based on the total weight of the $NO_X$ storage catalyst.

6. The $NO_X$ storage catalyst of claim 5, wherein the CHA zeolite is aluminosilicate zeolite.

7. The $NO_X$ storage catalyst of claim 6, wherein the CHA zeolite has a Si/Al mole ratio of about 1 to about 50.

8. The $NO_X$ storage catalyst of claim 6, wherein the CHA zeolite has a Si/Al mole ratio of about 1 to about 50.

9. The $NO_X$ storage catalyst of claim 5, wherein the CHA zeolite has a Si/Al mole ratio of about 1 to about 50.

10. A $NO_X$ storage catalyst comprising:
CHA zeolite;
Cu ion-exchanged in the CHA zeolite, wherein the NOX storage catalyst comprises about 1.5 wt % to about 3 wt % of the Cu based on a total weight of the NOX storage catalyst; and
a rare earth metal supported on the CHA zeolite, wherein the rare earth metal consists essentially of La such that the $NO_X$ storage catalyst comprises about 16 wt % to about 30 wt % of the La based on the total weight of the $NO_X$ storage catalyst or wherein the rare earth metal consists essentially of Ce such that the $NO_X$ storage catalyst comprises about 16 wt % to about 30 wt % of the Ce based on the total weight of the $NO_X$ storage catalyst;
wherein the $NO_X$ storage catalyst exhibits physical properties resulting from having been prepared by a method comprising:
preparing a synthetic mother liquid including a zeolite raw material as a source of silica and alumina, a structure-inducing material, a complexing material, and a solvent, wherein the structure-inducing material comprises benzyl trimethyl ammonium chloride;
reacting the synthetic mother liquid to prepare the CHA zeolite; and
supporting the Cu and the rare earth metal on the prepared CHA zeolite.

11. The $NO_X$ storage catalyst of claim 10, wherein the CHA zeolite is aluminosilicate zeolite.

12. The $NO_X$ storage catalyst of claim 11, wherein the CHA zeolite has a Si/Al mole ratio of about 1 to about 50.

13. The $NO_X$ storage catalyst of claim 10, wherein the CHA zeolite has a Si/Al mole ratio of about 1 to about 50.

14. The $NO_X$ storage catalyst of claim 10, wherein the zeolite raw material comprises a zeolite Y.

15. The $NO_X$ storage catalyst of claim 10, wherein the zeolite raw material comprises an ultra-stable zeolite Y (zeolite USY).

16. The $NO_X$ storage catalyst of claim 10, wherein the zeolite raw material has a $SiO_2/Al_2O_3$ mole ratio of about 5 to about 100.

17. The $NO_X$ storage catalyst of claim 11, wherein the synthetic mother liquid comprises about 0.1 parts by mole to about 0.4 parts by mole of the structure-inducing material and about 0.1 parts by mole to about 0.4 parts by mole of the complexing material based on 1 part by mole of the source of silica and the alumina.

* * * * *